(12) United States Patent
Dutch et al.

(10) Patent No.: US 10,055,298 B2
(45) Date of Patent: *Aug. 21, 2018

(54) DATA ACCESS DURING DATA RECOVERY

(71) Applicant: EMC IP Holding Company LLC, Hopkinton, MA (US)

(72) Inventors: Michael John Dutch, Los Gatos, CA (US); Christopher Hercules Claudatos, San Jose, CA (US); Mandavilli Navneeth Rao, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/605,133

(22) Filed: May 25, 2017

(65) Prior Publication Data

US 2017/0329676 A1 Nov. 16, 2017

Related U.S. Application Data

(63) Continuation of application No. 12/828,213, filed on Jun. 30, 2010, now Pat. No. 9,697,086.

(51) Int. Cl.
| | | |
|---|---|---|
| *G06F 11/14* | (2006.01) | |
| *G06F 13/26* | (2006.01) | |
| *G06F 13/38* | (2006.01) | |

(52) U.S. Cl.
CPC ...... *G06F 11/1448* (2013.01); *G06F 11/1466* (2013.01); *G06F 11/1469* (2013.01); *G06F 13/26* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 5,265,245 A | 11/1993 | Nordstrom | |
| 5,636,360 A | 6/1997 | Courts | |
| 5,896,539 A | 4/1999 | Arimilli | |
| 6,397,379 B1 | 5/2002 | Yates, Jr. | |
| 6,601,129 B1 * | 7/2003 | Arakeri | G06F 3/023 |
| | | | 710/300 |
| 6,711,162 B1 * | 3/2004 | Ortega | H04L 29/06 |
| | | | 370/389 |
| 7,356,679 B1 | 4/2008 | Le | |
| 7,475,282 B2 | 1/2009 | Tormasov | |
| 7,523,231 B1 | 4/2009 | Gupta | |
| 7,640,353 B2 | 12/2009 | Shen | |
| 7,685,129 B1 | 3/2010 | LeCrone | |
| 7,774,316 B2 | 8/2010 | Breau | |
| 7,984,327 B2 | 7/2011 | Winokur | |

(Continued)

FOREIGN PATENT DOCUMENTS

CN 101414277 4/2009

*Primary Examiner* — Henry Tsai
*Assistant Examiner* — Christopher Bartels
(74) *Attorney, Agent, or Firm* — Van Pelt, Yi & James LLP

(57) ABSTRACT

A method, article of manufacture, and apparatus for accessing data during data recovery. In some embodiments, this includes sending an I/O request from an application to an object, wherein the object is being recovered, establishing an I/O intercept, intercepting the application's I/O request with the I/O intercept, and redirecting the I/O request based on the status of the object's sub-objects.

20 Claims, 5 Drawing Sheets

(56) References Cited

U.S. PATENT DOCUMENTS

| | | | |
|---|---|---|---|
| 8,127,095 B1 | 2/2012 | Colgrove | |
| 8,463,798 B1 | 6/2013 | Claudatos | |
| RE44,814 E * | 3/2014 | Perholtz | 379/38 |
| 2001/0011254 A1 | 8/2001 | Clark | |
| 2002/0059539 A1 | 5/2002 | Anderson | |
| 2002/0083364 A1 | 6/2002 | Christensen | |
| 2002/0103814 A1* | 8/2002 | Duvillier | G06F 17/30356 |
| 2002/0112022 A1 | 8/2002 | Kazar | |
| 2002/0112089 A1 | 8/2002 | Zargham | |
| 2004/0107025 A1* | 6/2004 | Ransom | G05B 19/4185 |
| | | | 700/286 |
| 2004/0107199 A1 | 6/2004 | Dalrymple | |
| 2004/0128673 A1 | 7/2004 | Fuchs | |
| 2005/0044162 A1 | 2/2005 | Liang | |
| 2005/0066000 A1* | 3/2005 | Liaw | G06F 13/385 |
| | | | 709/204 |
| 2005/0144251 A1* | 6/2005 | Slate | H04L 29/06 |
| | | | 709/215 |
| 2005/0246345 A1 | 11/2005 | Lent | |
| 2006/0031510 A1 | 2/2006 | Beck | |
| 2006/0047999 A1 | 3/2006 | Passerini | |
| 2006/0143501 A1 | 6/2006 | Tormasov | |
| 2006/0224843 A1 | 10/2006 | Rao | |
| 2006/0242330 A1 | 10/2006 | Torudbakken | |
| 2007/0022176 A1* | 1/2007 | Kobayashi | H04L 12/12 |
| | | | 709/217 |
| 2007/0201502 A1 | 8/2007 | Abramson | |
| 2007/0220320 A1 | 9/2007 | Sen | |
| 2007/0300063 A1* | 12/2007 | Adams | G06F 21/35 |
| | | | 713/168 |
| 2008/0010340 A1* | 1/2008 | Orady | G06F 3/14 |
| | | | 709/203 |
| 2008/0082589 A1 | 4/2008 | English | |
| 2008/0091741 A1 | 4/2008 | Zohar | |
| 2008/0117909 A1 | 5/2008 | Johnson | |
| 2008/0120352 A1 | 5/2008 | Nishi | |
| 2008/0162595 A1 | 7/2008 | Kushwah | |
| 2009/0024847 A1* | 1/2009 | Sun | G06F 21/6209 |
| | | | 713/165 |
| 2009/0077019 A1 | 3/2009 | Todd | |
| 2009/0132616 A1 | 5/2009 | Winter | |
| 2009/0133028 A1 | 5/2009 | Brown | |
| 2009/0161679 A1 | 6/2009 | Yang | |
| 2009/0313447 A1 | 12/2009 | Nguyen | |
| 2010/0005337 A1 | 1/2010 | Bensinger | |
| 2010/0017686 A1 | 1/2010 | Luby | |
| 2010/0049921 A1 | 2/2010 | Aronovich | |
| 2010/0100764 A1 | 4/2010 | Kalos | |
| 2010/0115332 A1 | 5/2010 | Zheng | |
| 2010/0211822 A1 | 8/2010 | Colaiacomo | |
| 2010/0248681 A1* | 9/2010 | Phills | G08B 27/005 |
| | | | 455/404.2 |
| 2010/0289768 A1 | 11/2010 | Nakao | |
| 2011/0004878 A1* | 1/2011 | Divoux | G06F 9/4856 |
| | | | 718/1 |
| 2011/0029836 A1 | 2/2011 | Dhuse | |
| 2011/0066803 A1 | 3/2011 | Arakawa | |
| 2011/0145886 A1 | 6/2011 | McKenzie | |
| 2011/0167239 A1 | 7/2011 | Horn | |
| 2012/0011340 A1 | 1/2012 | Flynn | |
| 2012/0089700 A1 | 4/2012 | Safruti | |
| 2013/0035143 A1* | 2/2013 | Izutsu | G06F 1/1632 |
| | | | 455/566 |
| 2015/0339216 A1* | 11/2015 | Wade | G06F 11/3688 |
| | | | 714/38.1 |

* cited by examiner

DATA ACCESS DURING DATA RECOVERY

CROSS REFERENCE TO OTHER APPLICATIONS

This application is a continuation of co-pending U.S. patent application Ser. No. 12/828,213, entitled DATA ACCESS DURING DATA RECOVERY filed Jun. 30, 2010 which is incorporated herein by reference for all purposes.

FIELD OF THE INVENTION

The present invention relates generally to data systems, and more particularly, to systems and methods of efficiently protecting and accessing data.

BACKGROUND OF THE INVENTION

Modern data systems contain vast amounts of data. Such data systems may include, for example, email servers, commercial websites, banking records, government databases, etc.

Increasingly, there is an expectation that these data systems must always be accessible to the user. For example, if a commercial website is not accessible to the user, (e.g. Amazon.com went down), the business may lose millions of dollars of revenue for every day the website is inaccessible.

With an ever increasing amount of data, and an ever increasing expectation that the data be accessible, there is tremendous pressure to protect data systems. Conventional data protection schemes are used to restore data systems in case of disasters. However, these conventional data protection schemes are either too slow in recovering the data, or too expensive. Further, conventional data protection schemes require completely recovering the data before allowing access to the data.

Unfortunately, there may be times when data in a data system needs to be accessible before the recovery operation is complete.

There is a need, therefore, for an improved method, article of manufacture, and apparatus for protecting and accessing data in data systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
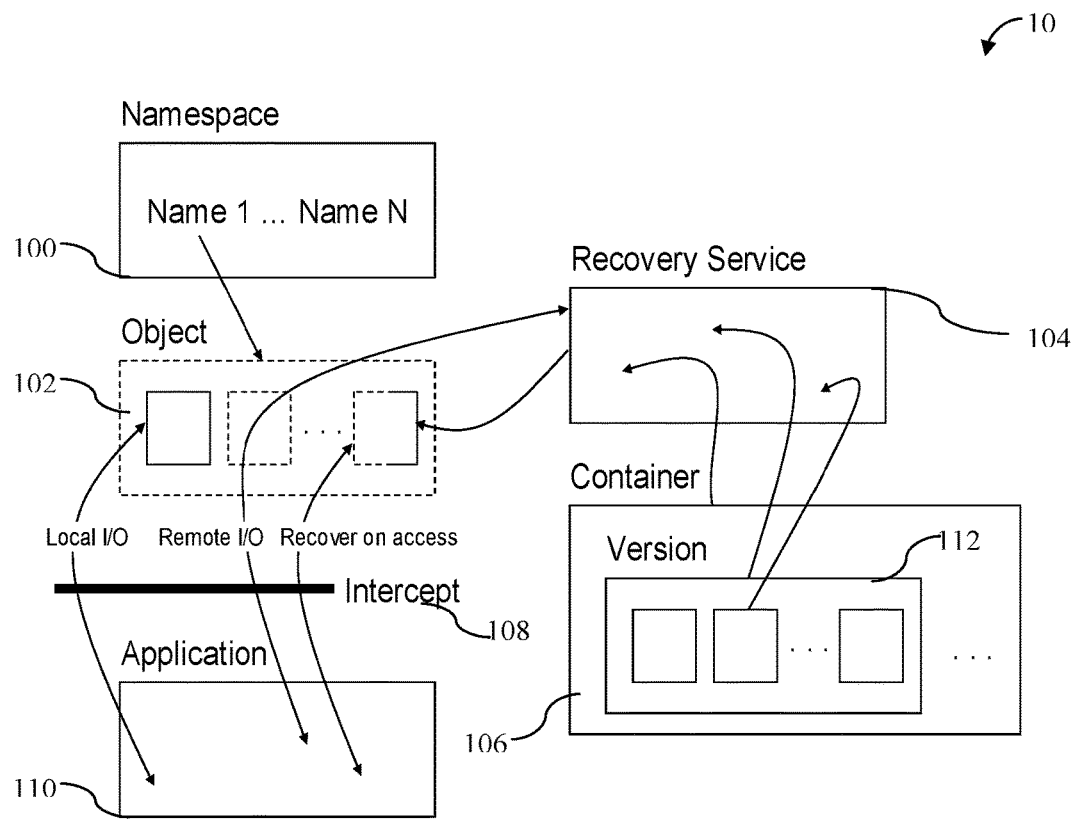
FIG. 1 is a diagram of a data system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 illustrates a data system in accordance with some embodiments of the present invention. Data System 10 includes Namespace 100, Object 102, Recovery Service 104, Container 106, Intercept 108, Application 110, and Version 112. Though FIG. 1 illustrates Namespace 100, Object 102, Recovery Service 104, Container 106, Intercept 108, Application 110, and Version 112 to be separate components, it should be understood that these components may reside in one or multiple machines. For example, Recovery Service 104 and Container 106 may reside in the same machine, while Intercept 108 and Application 110 reside in a different machine, and Object 102 and Namespace 100 reside in yet another different machine.

Namespace 100 includes a set of name-address pairs. For example, in some embodiments, Namespace 100 may include a file system directory structure. Namespace 100 is used by Application 110 to locate Object 102.

Container 106 contains backup data. The backup data may include several files, and several versions of the same file, as depicted by Version 112 in FIG. 1. For example, a first backup may store a preliminary version of a file. A second backup may store a final version of the file. During both backups, the file may have the same file name. Instead of overriding the preliminary version of the file, the second backup may store a second version of the file.

Version 112 may be segmented into sub-objects. It should be understood that though the term "Version" is used, there need not be multiple versions of a file in a container. For example, a container could have a File X, and only have one version of File X. In this case, it would be File X that is segmented into sub-objects.

Segmenting Version 112 may be accomplished by a variety of methods. In some embodiments, segmenting may be done using a predefined interval (e.g. create segments at every 10 kB). In some embodiments, segmenting may be done according to access pattern. For example, suppose Version 112 is a backup of a virtual machine. If the first 30 kB of Version 112 is necessary to boot the virtual machine, it may be preferable to segment the first 30 kB. The rest of Version 112 may be segmented into 30 kB segments, or may be segmented according to some other criteria (e.g. 40 kB segments, segmented according to other known access patterns, etc.). The remaining segments need not be identical in size to each other, or to the initial 30 kB segment. Segmenting may also be based upon metadata, such as file history maintained by an application, or upon policy or user command.

In some embodiments, segments may be assigned priorities. Priorities may be assigned through a variety of methods. In some embodiments, access patterns may be used as criteria in assigning priority. In the example above, it may be preferable to assign the highest priority to the first 30 kB of the backup of the virtual machine. Since any user of the virtual machine would first have to access the first 30 kB to boot the virtual machine, it would be preferable to recover the first 30 kB as quickly as possible. By assigning the highest priority to the first 30 kB, a recovery operation would be able to see the highest priority assigned to the first 30 kB, and recover it as soon as possible. Other access patterns may be used to determine priority. For example, suppose Version 112 is a backup of a Microsoft Word application, and that the last 5 kB of the backup contains the "most recently accessed files" list. A user may decide that they want to know which files were most recently accessed and assign that 5 kB segment a high priority. Similarly, a policy could be set such that the most recently accessed files are most likely the first to be accessed upon recovery, and assign each of the files in the "most recently accessed files" list a high priority. Low priorities may be set using similar logic. For example, if certain sub-objects are not likely to be accessed during a recovery operation, those sub-objects may be assigned a low priority.

Segments (e.g. sub-objects) or versions (e.g. objects) may be "pinned." Pinning an object or sub-object restricts the pinned object or sub-object to a "Remote I/O" setting during a recovery operation as described herein. Pinning may be preferable when the object being recovered is highly sensitive, and data integrity is of the utmost importance (outweighs performance importance). For example, if an object being recovered is a large database, data integrity may be compromised if recovery is done in parallel sub-objects. In this case, it may be preferable to quickly restore the large database to a remote location (but "local" to container, allowing rapid data transfer between the two), and allow remote access from the client. In this way, data integrity is protected, but the client may notice a decline in performance due to bandwidth and resource issues associated with accessing a remote location.

In cases where backup data includes a transactional database, it may be preferable to also backup a transaction log along with the data objects. For example, when a transactional database fails, the state of the objects being accessed at the time of the failure may be unknown. In some cases, the last write request may have been done, but there was no confirmation. In other cases, the last write request may not have been done at all. With a transaction log, it can be determined whether a write request had been properly executed, allowing a recovery operation to determine which version of a file to recover.

Figure 2:
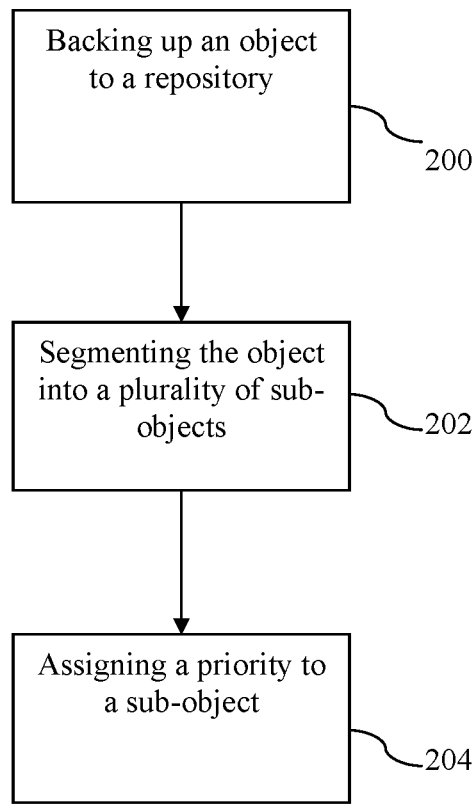
FIG. 2 is a flowchart of a method to backup data in accordance with some embodiments.

FIG. 2 illustrates a method to backup data in accordance with some embodiments. In step 200, an object is backed up to a repository. In step 202, the object is segmented into a plurality of sub-objects. As discussed above, the segmenting of objects may be based on a variety of criteria. For example, segmenting may be based on access pattern, metadata, policy or command, among others, or any combination of criteria. In step 204, a priority is assigned to a sub-object. As discussed above, priority may also be assigned based on a variety of criteria. For example, priority may be based on access pattern, metadata, policy, or user command, among others, or any combination of criteria. It should be noted that not every sub-object needs a priority assigned. In some embodiments, it may be preferable to "pin" a sub-object to Remote I/O during a recovery operation. In some embodiments, the prioritization itself may be stored as metadata in the backup repository, or as a header in each of the segments.

Application 110 includes one or more computing processes executing on one or more machines, where each computing process may perform input/output (I/O) from one or more devices. For example, in some embodiments, Application 110 may include a Microsoft Exchange Server client.

Recovery Service 104 manages the recovery of Object 102. In some embodiments, Recovery Service 104 may track changes to Object 102 and Version 112, such as during Remote I/O.

Figure 3:
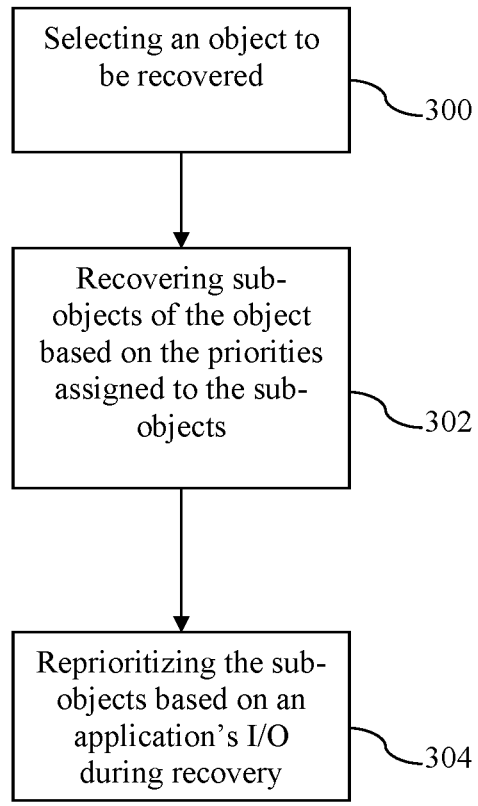
FIG. 3 is a flowchart of a method to recover data in accordance with some embodiments.

FIG. 3 illustrates a method to recover data in accordance with some embodiments. In step 300, an object is selected to be recovered. In step 302, the sub-objects of the object are recovered based on the priorities assigned to the sub-objects. In step 304, the sub-objects are reprioritized based on an application's I/O during recovery. For example, an application may want to access a sub-object with a low priority. If the sub-object has not been recovered yet, the sub-object's priority may be changed to high priority, so that the recovery operation can quickly recover the sub-object, and allow the application to access the sub-object.

Object 102 includes a data object that is being recovered by Recovery Service 104 while Application 110 is using the data object. Object 102 is restored using Version 112, which is part of Container 106. In some embodiments, Object 102 may be segmented into sub-objects. Segmenting Object 102 into sub-objects allows for parallel recovery of the sub-objects.

As illustrated by Object 102 in FIG. 1, Application 110 may access data objects through multiple methods. One method is Local I/O. This is when the data (e.g. sub-object) has been fully recovered to the local site. During local I/O, Intercept 108 allows Application 110 to locally access a sub-object in Object 102. In some embodiments, during Local I/O, Intercept 108 may act as an intermediary between Application 110 and the sub-object. For example, Application 110 may send a request to what Application 110 thinks is the sub-object. Intercept 108 intercepts the request, retrieves the requested data from the sub-object, and sends the requested data to Application 110. In some embodiments, during Local I/O, Intercept 108 may act as a gatekeeper, and allow Application 110 to communicate directly with the sub-object. For example, Application 110 may send a request to what Application 110 thinks is the sub-object. Intercept 108 intercepts the request, determines whether the request may proceed or not, and if so, allows the request to go through. Application 110 then receives the requested data directly from the sub-object. In some embodiments, after Intercept 108 has determined that Application 110 may directly communicate with the sub-object, subsequent requests by Application 110 to retrieve data from the sub-object need not undergo the determination phase as described herein (e.g. Intercept 108 will no longer need to determine if Application 110 may access the sub-object.) Though the term "Local I/O" is used, "Local" does not mean that Application 110 is accessing data that is on the same machine as Application 110. Rather, "Local" may include machines that are geographically distant, but may be connected by a comparatively higher bandwidth connection. "Local" may also include machines that are normally accessed by Application 110. For example, a Microsoft Exchange client resident in California may typically connect to data that is stored in Oregon. A backup copy of the data may be stored in Washington. During recovery, the backup copy is restored to Oregon. When a sub-object is restored to Oregon, the California client may "locally" access the Oregon sub-object via "Local I/O."

Another method of Application 110 accessing data is Remote I/O. This occurs when a sub-object has not been restored to the local site, but Application 110 needs access to the sub-object. This may also occur when the object or sub-objects being restored are "pinned" as described herein. In some embodiments, Intercept 108 will intercept Application 110's request, and redirect to Recovery Service 104. Recovery Service 104 will perform Application 110's request on a copy of the sub-object maintained by Recovery Service 104. Data objects which are accessed via Remote I/O are spun-up (e.g. booted, mounted, recovered, etc.) by Recovery Service 104 on a system with fewer resource constraints than at the primary system. For example, Recovery Service 104 may mount a virtual machine on a physical machine that is "local" to the container, resulting in a high bandwidth connection between the two, and allowing for a much faster restoration of the virtual machine. A remote connection is established between Application 110 and the spun-up data objects, allowing I/O operations. This may be useful when the sub-object has not been restored to the local site, but when immediate access to the sub-object is required or preferred. For example, it may take a significant amount of time to repair or replace failed components at the local site. During the interim, Application 110 may need to access data. Rather than wait for the replacement components to arrive, Application 110 may use Remote I/O to access data that is spun up by Recovery Service 104. Further, Remote I/O may be preferable when impact of concurrent recovery on application services using available network bandwidth is unacceptable, or when the risk of data integrity is too high, such as in the case when an object being restored is a large database.

Another method of Application 110 accessing data is Recover on Access. This includes Application 110 sending an I/O request to the sub-object, and Intercept 108 delaying the I/O request to the sub-object until the sub-object has been recovered. This may be preferable when the performance impact due to the delayed I/O request is tolerable.

In some embodiments, Intercept 108 is code that is transparent to Application 110. In other words, Application 110 thinks it is accessing Object 102 locally when in fact Intercept 108 is rerouting Application 110's instructions to Recovery Service 104.

Figure 4:
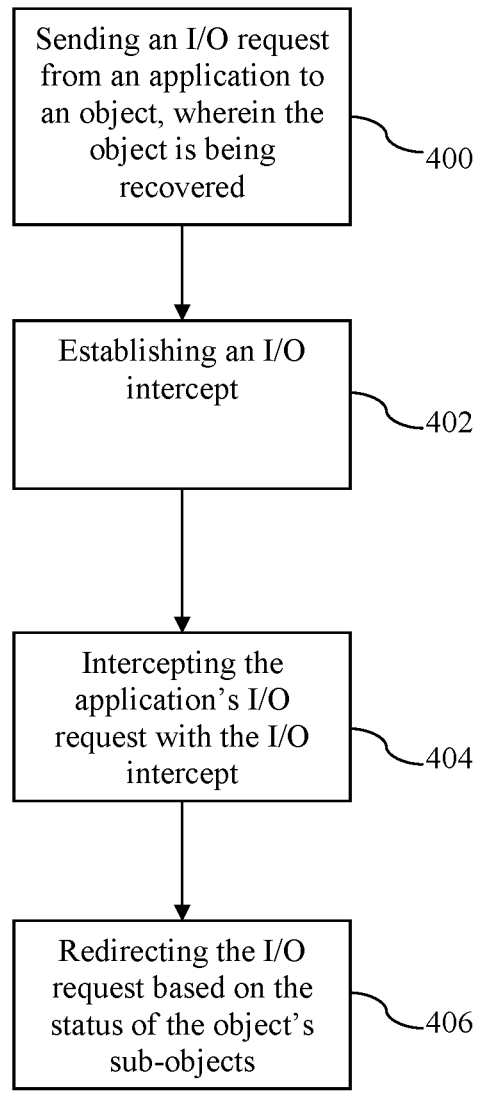
FIG. 4 is a flowchart of a method to access data in accordance with some embodiments.

FIG. 4 illustrates a method to access data during data recovery in accordance with some embodiments. In step 400, an I/O request is sent from an application to an object, wherein the object is being recovered. In step 402, an I/O intercept is established. In step 404, the application's I/O request is intercepted by the I/O intercept. In step 406, the I/O request is redirected based on the status of the object's sub-objects. In some embodiments, once an application is able to access a sub-object via Local I/O, the I/O intercept no longer needs to intercept the application's I/O requests because the sub-object has been recovered. In such cases, the I/O intercept may be abolished with regard to the recovered sub-object and allow the application's I/O requests to proceed uninhibited.

Recovery may be prioritized. As discussed above, segments of backup data (e.g. objects or versions) may have assigned priority. When a recovery operation detects these priorities, it may recover segments based on priority. For example, suppose the first 30 kB of an object is a segment containing the boot up information for a virtual machine, and the first 30 kB has been assigned the highest priority. When a recovery operation scans the object, it will identify the first 30 kB as having the highest priority, and begin restoring the first 30 kB before lower priority segments.

Priority of restoration may be dynamic during a recovery operation. For example, suppose the last 100 kB of a backup image, the backup image being a version, contains the two most recently accessed files, File A and File B. A post-back up operation may have identified these files to be a high priority since they were the two most recently accessed files, and a policy dictated that recently accessed files are to be assigned a high priority. However, during a recovery process, a user may attempt to access the middle 50 kB, which contains a rarely accessed File C. Since File C is rarely accessed, a policy may have dictated that it be assigned a low priority, and a recovery operation placed a low priority on restoring File C. When the recovery operation detects that an application is trying to access File C, or when an interceptor tells recovery operation that an application is trying to access File C, the recovery operation may change the priority of File C to high. Depending on the performance tolerance of File C, or other restrictions placed by policy or user, access to File C may be Remote I/O, or Recover on Access. For example, if the user considers File C to be a very important file, where data integrity is of the utmost importance, the user may force the recovery operation to allow access to File C via Remote I/O. In another example, if File C can be restored in a relatively short period of time, and the user can tolerate the performance decline (e.g. waiting for File C to be restored before accessing), then the recovery operation may use Recovery on Access as described herein.

Further, priorities may be altered during an object close. For example, suppose an object, object Z is being restored. Object Z has three sub-objects, sub-objects A, B, and C. A has been restored, and is accessed by an application via Local I/O. B is being restored, but has not yet been restored. C has been "pinned," and is restricted to remote I/O. During the recovery operation, an application accesses only sub-object A. Before recovery of B or C, the application is finished with object Z, and closes object Z. At this point, it may be preferable to re-assign B and C to a low priority since the application may be done with object Z and need not access it for the remainder of the recovery operation.

In some embodiments, it may be preferable to retain a copy of an altered sub-object as a result of Remote I/O. Using the above example, suppose the application had accessed sub-object A via Local I/O, and sub-object C via Remote I/O. Before recovery has been completed, the application is finished with object Z. In this case, it may be beneficial for the recovery operation to preserve the changes made to sub-object C (e.g. preserve the remote copy of sub-object C), and to maintain the I/O intercept. Maintaining the I/O intercept would be helpful in case the application again wants to access sub-object C during the recovery operation. Preserving the remote copy of C would be also be helpful in case the application gain wants to access sub-object C during the recovery operation. Once the application has closed object Z, the recovery operation may begin restoring the remote copy of C to the desired restoration target, or may postpone restoration of the remote copy of C due to re-assignment in priority or other settings determined by policy or user.

Figure 5:
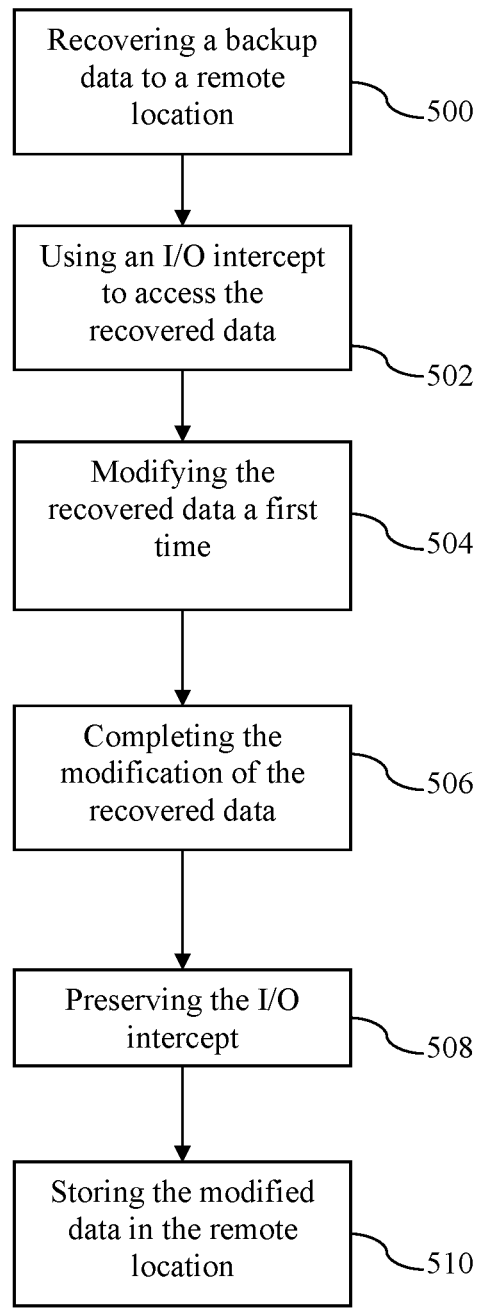
FIG. 5 is a flowchart of a method to preserve data in accordance with some embodiments.

FIG. 5 illustrates a method to preserve data changes made during data recovery in accordance with some embodiments. In step 500, a backup is recovered to a remote location. In step 502, an I/O intercept is used to access the recovered data. In step 504, the recovered data is modified a first time. In step 506, the modification of the recovered data is complete (e.g. an application has closed the object). In step 508, the I/O intercept is preserved. In step 510, the modified data is stored in the remote location. In some embodiments, the application may again access the modified data after closing the object (e.g. access the backup data a second time). In this case, it is helpful to maintain the I/O intercept to facilitate Remote I/O. In some embodiments, after the modified data has been recovered to the local location (e.g. the remote location data has been fully restored to the local location), the modified data stored at the remote location may be deleted, may be added to the backup data, or may replace the backup data. The modified data may also be deleted from the remote location once a copy has been restored to the local location.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method, comprising:
   intercepting a request to access an object that is being recovered as part of a data recovery operation currently being performed, wherein the object includes one or more sub-objects;
   in response to intercepting the access request, determining a recovery status for a first sub-object of the one or more sub-objects in relation to the data recovery operation;
   determining, based at least in part on the determined recovery status of the first sub-object, an access method for accessing at least one of the one or more sub-objects in connection with the request to access the object, wherein determining whether the first sub-object is to be accessed via local I/O, remote I/O, or recovery on access based at least in part on the recovery status for the first sub-object, and wherein the determining of the access method is performed in connection with the recovery operation currently being performed;
   in response to determining that the first sub-object is available via local I/O and that I/O has been successfully performed on a local copy of the first sub-object, accessing the local copy of the first sub-object; and
   in response to determining that the first sub-object is available via local I/O and that I/O has not been performed on the local copy of the first sub-object, rerouting, an I/O request to access the object to a recovery service that manages recovery of the object.

2. The method of claim 1, wherein the determining the access method further includes determining whether to change a priority of the first sub-object.

3. The method of claim 1, wherein the request to access the object is intercepted by an I/O intercept, and wherein the I/O intercept is configured to apply the determined access method and transparently redirect the I/O request.

4. The method of claim 3, wherein in response to determining that the first sub-object is available via local I/O and that I/O has been successfully performed on the local copy of the first sub-object, the I/O intercept is abolished with regard to the local copy of the first sub-object after the I/O has been successfully performed on the local copy of the first sub-object.

5. The method of claim 3, wherein the I/O request to access the object is rerouted by the I/O intercept.

6. The method of claim 1, wherein the determining the recovery status of the first sub-object includes determining whether the first sub-object is available via local I/O, remote I/O, or recovery on access.

7. The method of claim 6, wherein in response to determining that the first sub-object is available via local I/O, the access method for an application to access the object includes redirecting the I/O request to a local copy of the first sub-object.

8. The method of claim 6, wherein in response to determining that the first sub-object is available via remote I/O, the access method for an application to access the object includes redirecting the I/O request to a remote copy of the first sub-object.

9. The method of claim 8, wherein the first sub-object is available via remote access and the I/O request is redirected to a remote copy of the first sub-object based at least in part on a pinned status of at least the first sub-object, and wherein pinning at least the first sub-object restricts access to the first sub-object to remote I/O.

10. The method of claim 6, wherein in response to determining that the first sub-object is available via recovery on access, the access method for an application to access the object includes holding the I/O request until the first sub-object has been recovered.

11. The method of claim 6, further comprising spinning up at least the first sub-object on a system and establishing a connection between an application and the spun-up first sub-object.

12. The method of claim 11, wherein the system comprises a virtual machine mounted on top of a physical machine that is connected by a comparatively high bandwidth connection to a storage container storing the first sub-object.

13. The method of claim 1, wherein the object is segmented into the one or more sub-objects based at least in part on one or more of the following: a predefined segment interval, an access pattern associated with the object, metadata, one or more policies, and one or more user commands.

14. The method of claim 1, wherein each of at least a subset of the one or more sub-objects is assigned a recovery priority based at least in part on one or more of the following: an access pattern associated with the object, metadata, one or more polices, and one or more user commands.

15. The method of claim 14, wherein the recovery priority corresponding to at least one of the one or more sub-objects is dynamically changed during the data recovery operation.

16. The method of claim 14, wherein the recovery priority corresponding to the at least one of the one or more sub-objects is dynamically changed during the data recovery operation based on one or more access requests for the at least one of the one or more sub-objects.

17. The method of claim 1, wherein each of at least a subset of the one or more sub-objects is assigned a recovery priority, wherein the recovery priority is stored in metadata or a header associated with the subset of the one or more sub-objects.

18. The method of claim 17, wherein the recovery priority for at least one of the one or more sub-objects is updated during the recovery operation based at least in part on an access request for accessing the at least one of the one or more sub-objects.

19. A system for accessing data during data recovery, comprising a storage device and a processor configured to:
intercept a request to access an object that is being recovered as part of a data recovery operation currently being performed, wherein the object includes one or more sub-objects;
in response to intercepting the access request, determine a recovery status for a first sub-object of the one or more sub-objects in relation to the data recovery operation;
determine, based at least in part on the determined recovery status of the first sub-object, an access method for accessing at least one of the one or more sub-objects in connection with the request to access the object, wherein determining whether the first sub-object is to be accessed via local I/O, remote I/O, or recovery on access based at least in part on the recovery status for the first sub-object, and wherein the determining of the access method is performed in connection with the recovery operation currently being performed;
in response to determining that the first sub-object is available via local I/O and that I/O has been successfully performed on a local copy of the first sub-object, access the local copy of the first sub-object; and
in response to determining that the first sub-object is available via local I/O and that I/O has not been performed on the local copy of the first sub-object, reroute, an I/O request to access the object to a recovery service that manages recovery of the object.

20. A computer program product for accessing data during data recovery, comprising a non-transitory computer usable medium having machine readable code embodied therein for:
intercepting a request to access an object that is being recovered as part of a data recovery operation currently being performed, wherein the object includes one or more sub-objects;
in response to intercepting the access request, determining a recovery status for a first sub-object of the one or more sub-objects in relation to the data recovery operation;
determining, based at least in part on the determined recovery status of the first sub-object, an access method for accessing at least one of the one or more sub-objects in connection with the request to access the object, wherein determining whether the first sub-object is to be accessed via local I/O, remote I/O, or recovery on access based at least in part on the recovery status for the first sub-object, and wherein the determining of the access method is performed in connection with the recovery operation currently being performed;
in response to determining that the first sub-object is available via local I/O and that I/O has been successfully performed on a local copy of the first sub-object, accessing the local copy of the first sub-object; and
in response to determining that the first sub-object is available via local I/O and that I/O has not been performed on the local copy of the first sub-object, rerouting, an I/O request to access the object to a recovery service that manages recovery of the object.

* * * * *